I. FETTERS.
CORN HARVESTER.
APPLICATION FILED APR. 2, 1910.

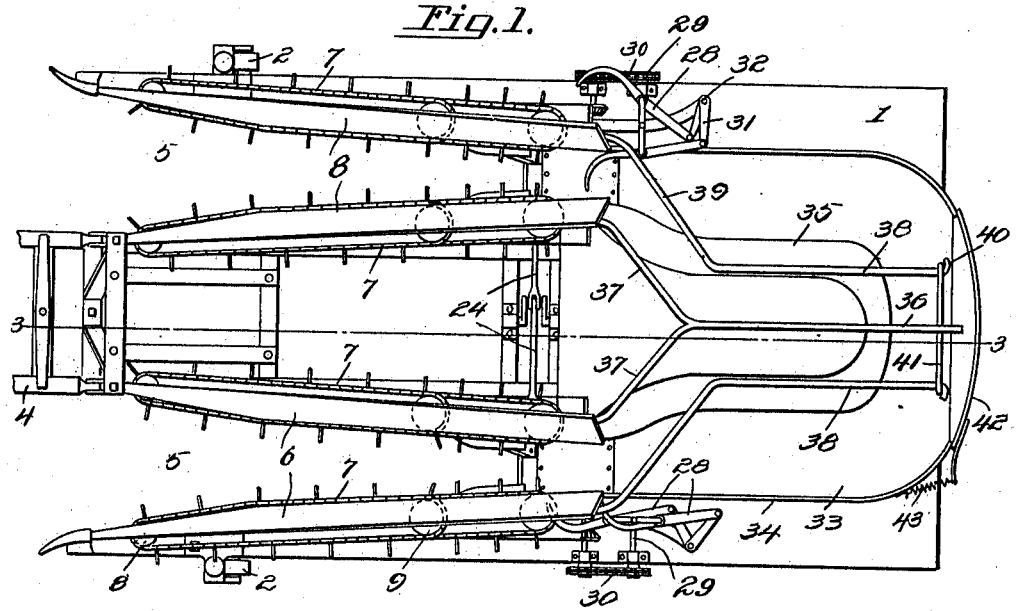

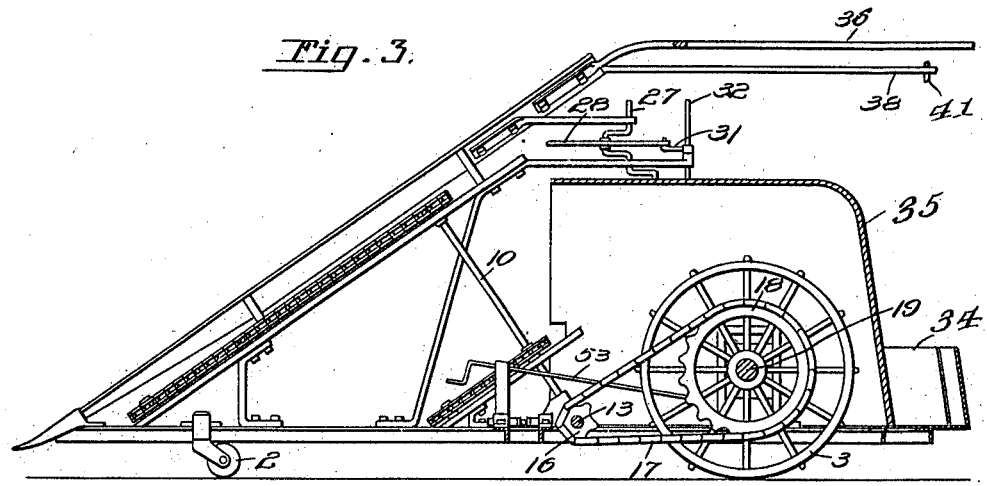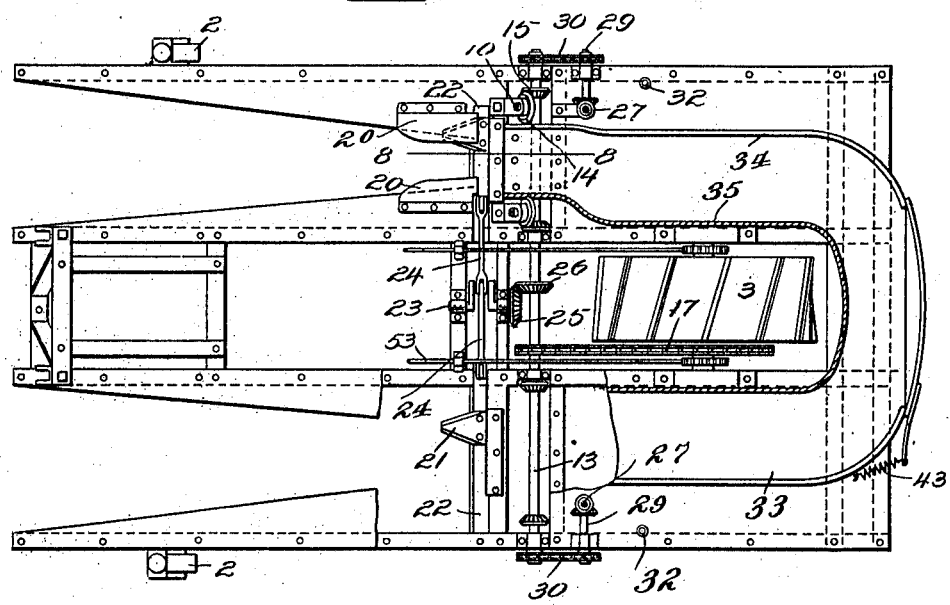

982,582.

Patented Jan. 24, 1911.
4 SHEETS—SHEET 3.

Witnesses
F. C. Gibson.
V. B. Hillyard.

Inventor
Irvin Fetters.

By Victor J. Evans
Attorney

I. FETTERS.
CORN HARVESTER.
APPLICATION FILED APR. 2, 1910.
982,582.
Patented Jan. 24, 1911.
4 SHEETS—SHEET 4.
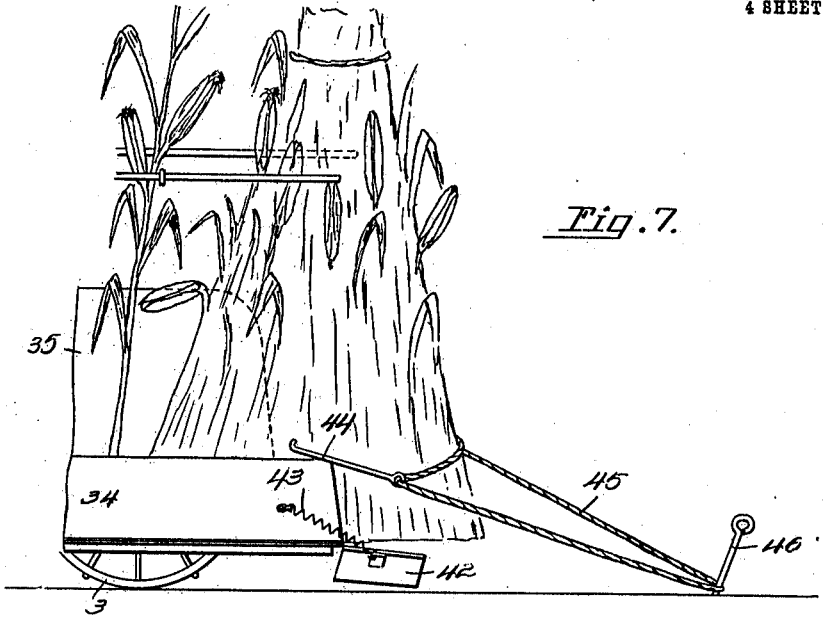
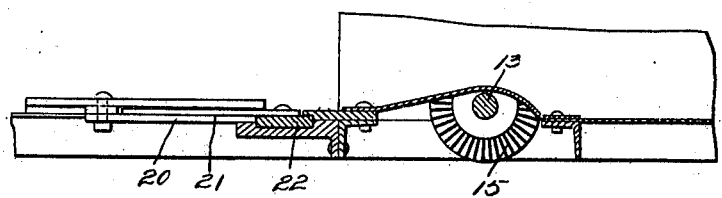
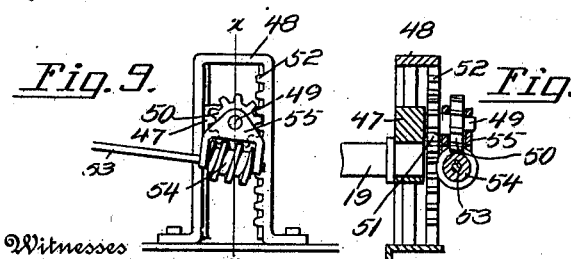
Witnesses
F. C. Gibson.
V. B. Hillyard.
Inventor
Irvin Fetters.
By Victor J. Evans
Attorney

UNITED STATES PATENT OFFICE.

IRVIN FETTERS, OF FINDLAY, OHIO.

CORN-HARVESTER.

982,582.

Specification of Letters Patent. Patented Jan. 24, 1911.

Application filed April 2, 1910. Serial No. 552,991.

*To all whom it may concern:*

Be it known that I, IRVIN FETTERS, a citizen of the United States, residing at Findlay, in the county of Hancock and State of Ohio, have invented new and useful Improvements in Corn-Harvesters, of which the following is a specification.

The present invention provides a machine for operation in the field for harvesting corn and analogous product, the purpose being to provide a machine which will cut and gather two rows of corn at the same time and form the same into a shock, the latter being carried upon the machine and deposited upon the ground after the required size has been attained.

The invention contemplates a machine embodying novel means for gathering the stalks and directing the same to the cutting mechanism and subsequently moving the same positively through a passageway in which the stalks accumulate and form a shock, the latter being supported in upright position and when bound being discharged by the draft of the machine, the shock being anchored to the ground and drawn from the machine as the latter is advanced so that while the shock is discharging the machine simultaneously cuts and gathers other stalks preliminary to the formation of another shock.

The invention consists of the novel features, details of construction and combination of parts, which hereinafter will be more particularly set forth, illustrated in the accompanying drawings, and pointed out in the appended claims.

Figure 5:
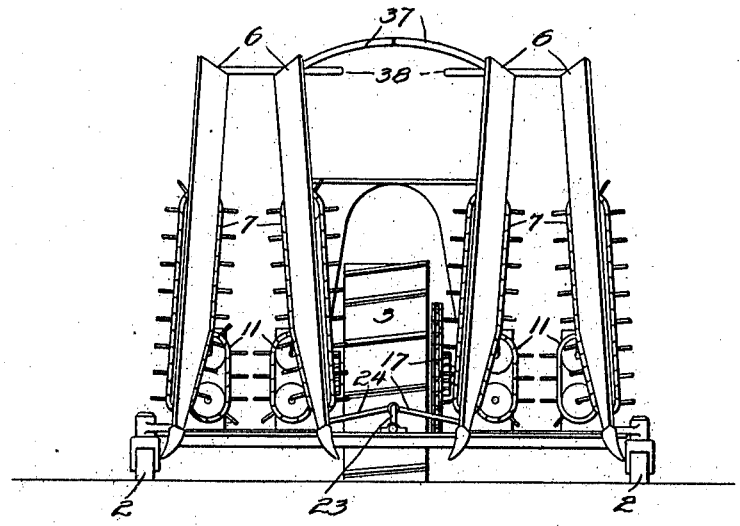
Figure 6:
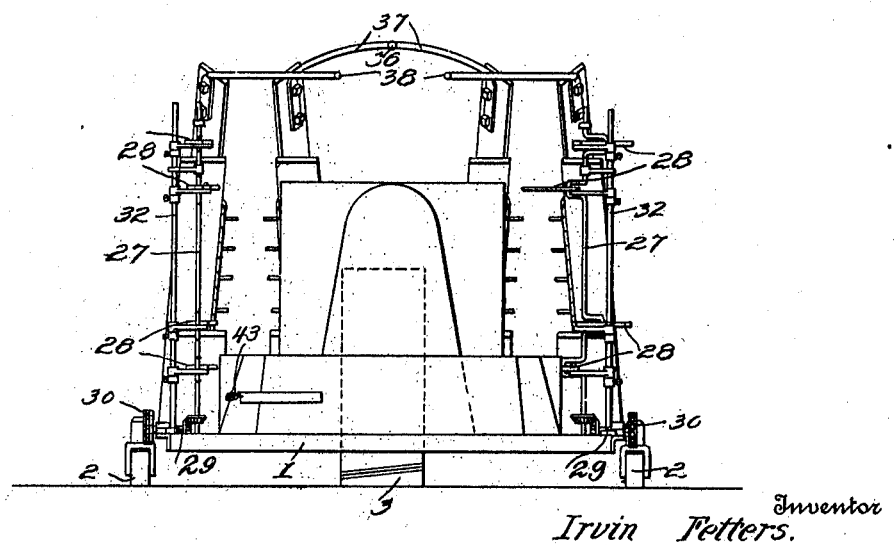

Referring to the drawings, forming a part of the application, Figure 1 is a top plan view of a corn harvester embodying the invention. Fig. 2 is a side view thereof. Fig. 3 is a vertical central longitudinal section on the line 3—3 of Fig. 1. Fig. 4 is a horizontal section on the line 4—4 of Fig. 2, parts being broken away. Fig. 5 is a front view of the machine. Fig. 6 is a rear view of the machine. Fig. 7 is a detail view in elevation of the rear portion of the machine, showing the manner of discharging a shock. Fig. 8 is a sectional view on the line 8—8 of Fig. 4, showing more particularly the cutting mechanism. Fig. 9 is a detail view of the means whereby the main frame may be adjusted vertically at its rear end. Fig. 10 is a sectional detail on the line x—x of Fig. 9.

Corresponding and like parts are referred to in the following description, and indicated in all the views of the drawings, by the same reference characters.

The main frame comprises a low platform 1 which is mounted upon caster wheels 2 and a large wheel 3, the latter being centrally disposed and constituting a driver and located near the rear of the machine. The single wheel 3 is broad faced so as to support the machine on comparatively soft ground and is provided around its tread with ribs or projecting parts to prevent slipping. The caster wheels 2 are located near the front of the machine and upon opposite sides thereof, thereby preventing lateral tilting of the machine upon the single rear supporting wheel 3. The machine may be propelled over the field in any manner and is adapted to be drawn over the field by a team hitched to centrally disposed thills 4. Guides 5 are located upon opposite sides of a medial line in position to receive two rows of corn which are simultaneously cut and formed into a shock upon the platform 1. The guides 5 constitute spaces which flare toward their front ends and are inclosed between guides 6, which flare upwardly and incline upwardly and rearwardly from their lower front ends. The guards 6 are supported upon transversely spaced extensions of the platform 1, it not being essential that the said guards or walls cover the entire space formed between the platform and their upper edges, since the stalks are of a height usually to project some considerable distance above the guards. Feed chains 7 are located near the upper edges of the guards and are provided with fingers which extend into the guide spaces 5 so as to engage with the stalks and move the same positively through the guide spaces toward the cutting mechanism and into the shock forming passage. The feed chains 7 may be supported in any manner and as shown pass around sprocket wheels 8 and 9, the sprocket wheels 8 being located near the lower front ends of the guards and the sprocket wheels 9 near the upper rear ends of said guards and fastened to shafts 10, which incline upwardly and forwardly. Lower feed chains 11 are supported in a similar manner to the upper feed chains 7 and receive motion from sprocket wheels 12 secured to the shafts 10. A transverse shaft 13 receives power from the drive wheel 3 and is geared to the shafts 10 so as to impart motion to the feed chains 7 and 11 in a manner so that their inner runs or portions bordering upon the guide spaces 5 travel rearwardly. As indicated most clearly in Fig. 4 the shafts 10 have bevel pinions 14 at their lower ends which are in mesh with bevel pinions 15 fastened to the transverse shaft 13. By this means the several shafts 10 receive motion from the transverse shaft 13. A sprocket wheel 16 secured to the shaft 13 receives a sprocket chain 17, which passes around a sprocket wheel 18 secured upon the axle 19 of the drive wheel 3, whereby motion is imparted from said axle to the shaft 13.

The cutting mechanism is located at the inner ends of the guide spaces 5 and consists of two blades 20, which are stationary, and movable blades 21, the latter being secured to bars 22, which are mounted in suitable guides to have a reciprocating movement imparted thereto. A crank shaft 23 is mounted in bearings applied to cross bars of the main frame and has its crank portion connected by pitmen 24 to the bars 22 so as to impart a reciprocating movement thereto. A bevel gear 25, secured to the rear end of the crank shaft 23, meshes with a bevel gear 26 fastened to the shaft 13. By these means the bars 22 provided with the cutters 21 are reciprocated.

Vertical shafts 27 are located at opposite sides of the machine and are provided near their upper and lower ends with oppositely disposed crank portions which have connection with packers 28, by means of which the stalks are moved rearward in a positive manner through the shock forming passages. The shafts 27 are geared at their lower ends to short transverse shafts 29, which in turn are connected with the shaft 13 so as to be driven therefrom by sprocket chains 30. The packers 28 consist of arms having an approximate longitudinal arrangement and having their forward ends curved and adapted to sweep across the receiving ends of the shock forming passages so as to move the corn rearwardly therein. The packers 28 are mounted intermediate of their ends upon the crank portions of the shafts 27 and their rear ends are pivotally connected to links 31 which are pivotally mounted upon vertical shafts 32 in the rear of the shafts 27. The packers in the operation of the machine receive a combined oscillatory and reciprocating movement. The oscillatory movement imparted to the packers causes their forward ends to engage with the stalks in the rearward movement and to clear the stalks in the forward movement, whereas the reciprocating movement imparted to the packers carries said packers forward and backward.

The shock forming passage 33 is approximately of U-form, the side members facing forwardly and registering with the guide spaces 5 so as to receive the stalks therefrom when cut. The outer wall 34 of the shock forming passage is of considerably less height than the inner wall since it is required only to engage with the lower ends of the stalks. The inner wall 35 of the shock forming passage is U-shaped and its opposite portions forming the sides of the shock forming passage are upwardly converged and are joined at their upper ends so as to form a housing for the drive wheel 3, as indicated most clearly in Figs. 3 and 5. The front portions of the side walls 35 flare and make close connection with the inner guards 6. The inner walls of the shock forming passage also provide in effect a core piece about which the shock is formed, thereby causing the base of the shock to spread and the upper ends of the stalks to incline inwardly from opposite sides to form a mutual support. A longitudinal rod or bar 36 is located above the housing, core piece, or center portion of the U-shaped shock forming passage and supports the upper ends of the stalks and assists materially in centralizing the shock upon the platform. The forward end of the longitudinal rod or bar 36 is forked and the fork members 37 flare and are secured to the upper rear ends of the inner guards 6. Other longitudinal rods or bars 38 are located at the sides of the bar 36 and their forward ends are outwardly inclined, as indicated at 39, and are secured to the upper rear ends of the outer guards 6. The inclined portions 37 and 39 of the longitudinal bars 36 and 38 are parallel and in conjunction with the walls of the shock forming passage 33 provide supporting means for the corn during the formation of the shock. The rear ends of the bars 38 terminate in hooks 40 which support a cross piece 41, which latter sustains the shock until of desired proportions. A door 42 closes the space formed between the rear ends of the outer walls 34 and is hinged to the platform so as to swing outwardly and downwardly, as indicated in Fig. 7. A spring 43 serves normally to hold the door closed. After a shock has been formed and bound it may be discharged by anchoring the same to the ground in the rear of the machine and subsequently drawing the machine, with the result that the shock is pulled from the machine, as indicated in Fig. 7.

For discharging the shock hooks 44 are provided and a rope or cord 45 is passed through eyes formed at one end of the hooks, a pin 46 serving to secure the rope or cord 45 to the ground. The hooks are placed upon opposite sides of the shock with their hooked ends in engagement therewith and the rope or cord being anchored to the ground by means of the pin 46 and the machine advanced the shock is drawn from the machine and deposited upon the ground. It is to be understood that the cross piece 41 is disengaged from the hooked ends of the rods or bars 38 so that the shock may pass readily from between the bars 38, the rod or bar 36 slipping from the shock as the latter is drawn rearward.

The rear portion of the machine may be raised or lowered, thereby admitting of the stalks being cut to a greater or less distance from the surface of the ground according to the desired length of the stubble to remain. The axle 19 is mounted in bearings 47, which latter are mounted in guide frames 48 firmly connected at their lower ends to the platform or frame 1. Stub shafts 49 project from the bearings 47 and support worm gears 50 and spur gears 51, the latter meshing with vertically disposed teeth 52 provided upon a member of the guide frames 48. The gears 50 and 51 are connected rigidly to each other. Longitudinally disposed shafts 53 provided at their forward ends with cranks and at their rear ends with worm threads 54 are mounted in brackets 55 supported upon the stub shafts 49 so as to move with the bearings 47. Upon turning the shafts 53 the worm gears 50 are correspondingly rotated and cause a rotation of the spur gears 51, which latter meshing with the rack teeth 52 cause the guide frames 48 to move vertically and to raise or lower the platform or frame 1 at its rear end according to the direction of rotation of the shafts 53.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a corn harvester, the combination of a main frame having longitudinally arranged guide spaces upon opposite sides of a medial line and a shock forming passage of substantially U-form with its side members in communication with the said guide spaces, means for positively moving the stalks through the guide spaces, a cutting mechanism at the inner end of each guide space, a centrally disposed wheel constituting a driver for operating the working parts as well as supporting means for the machine, a housing inclosing the upper portion of said centrally disposed wheel and separating the members of the shock forming passage which extends along opposite sides and in the rear thereof, the side walls of said housing connecting with the inner walls of the before mentioned guide spaces, outer walls spaced from the housing and of considerably less height and connecting at their front ends with the outer walls of the said guide spaces, and having their rear ends spaced to form an opening, a door for closing the opening between the rear ends of the outer walls mounted to swing rearwardly and downwardly to clear the bottom of the shock forming passage, and a spring connecting an end of said door with the rear end of one of said outer walls.

2. In a corn harvester, the combination of a main frame having longitudinally arranged guide spaces upon opposite sides of a medial line and provided in the rear with a shock forming passage of substantially U-form, the inner walls of said passage forming a housing and having their front ends connecting with the inner walls of the guide spaces and the outer walls of said passage being of less height than the inner walls and connecting at their forward ends with the outer walls of said guide spaces, and having their rear ends spaced, a rearwardly and downwardly movable door closing the space formed between the rear ends of the outer walls, a cutting mechanism at the inner end of each guide space, means for moving the stalks through the guide spaces, packers at the inner ends of the guide spaces for condensing the stalks in the shock forming passage, a longitudinal rod centrally disposed above the said housing and having its front end forked, the fork members being forwardly flared and connected to the inner walls of the said guide spaces, longitudinal rods at the sides of the first mentioned longitudinal rod having their front portions outwardly flared and connected to the outer walls of said guide spaces, and a cross piece connecting the rear ends of the last mentioned longitudinal rods.

In testimony whereof I affix my signature in presence of two witnesses.

IRVIN FETTERS.

Witnesses:
 RUSSELL B. EKEY,
 CHARLES E. JORDAN.